(12) United States Patent
Lu

(10) Patent No.: US 11,798,734 B2
(45) Date of Patent: Oct. 24, 2023

(54) WIRELESS CHARGING MOUSE PAD AND MANUFACTURE PROCESS THEREOF

(71) Applicant: DEXIN CORPORATION, New Taipei (TW)

(72) Inventor: Ho Lung Lu, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 978 days.

(21) Appl. No.: 16/401,296

(22) Filed: May 2, 2019

(65) Prior Publication Data

US 2020/0218370 A1    Jul. 9, 2020

(30) Foreign Application Priority Data

Jan. 8, 2019   (TW) ................. 108100637

(51) Int. Cl.
| | |
|---|---|
| *G06F 3/039* | (2013.01) |
| *H01F 38/14* | (2006.01) |
| *B32B 5/02* | (2006.01) |
| *B32B 5/16* | (2006.01) |
| *B32B 27/12* | (2006.01) |
| *H02J 50/00* | (2016.01) |
| *H02J 50/10* | (2016.01) |
| *H02J 7/00* | (2006.01) |
| *B32B 37/12* | (2006.01) |

(52) U.S. Cl.
CPC ............... *H01F 38/14* (2013.01); *B32B 5/02* (2013.01); *B32B 5/16* (2013.01); *B32B 27/12* (2013.01); *G06F 3/0395* (2013.01); *H02J 7/0042* (2013.01); *H02J 50/005* (2020.01); *H02J 50/10* (2016.02); *B32B 37/12* (2013.01); *B32B 2264/1021* (2020.08); *B32B 2457/10* (2013.01)

(58) Field of Classification Search
CPC ........ G06F 3/0395; H01F 38/14; H02J 7/025; H02J 7/0042; H02J 50/005; H02J 50/10; B32B 5/02; B32B 5/16; B32B 27/12
See application file for complete search history.

(56) References Cited

FOREIGN PATENT DOCUMENTS

| CN | 108427514 A | * | 8/2018 | ............ G06F 3/039 |
| CN | 208172753 U | * | 11/2018 | ............ G06F 3/039 |
| TW | M581529 U |   | 8/2019 | |

OTHER PUBLICATIONS

English translation to CN-208172753-U obtained from PE2E database (Year: 2018).*
English translation to CN-108427514-A obtained from PE2E database (Year: 2018).*
Taiwanese Office Action which corresponds to Application No. 108100638; dated Jan. 9, 2020.
Taiwanese Search Report along with a English Language Translation which corresponds to Application No. 108100638; dated Jan. 8, 2020.

* cited by examiner

*Primary Examiner* — Jeremy R Pierce
(74) *Attorney, Agent, or Firm* — Muncy. Geissler, Olds & Lowe, P.C.

(57) ABSTRACT

A wireless charging mouse pad, including: a fiber layer; a first colloid adhered to a surface of the fiber layer; a second colloid provided on another surface of the fiber layer; and a first soft layer provided on the second colloid. The invention further relates to a manufacture process of a wireless charging mouse pad, the wireless charging mouse pad is flexible and may be furled to reduce its volume, so that the space occupied may be decreased and the wireless charging mouse pad may be convenient to carry.

2 Claims, 13 Drawing Sheets

WIRELESS CHARGING MOUSE PAD AND MANUFACTURE PROCESS THEREOF

BACKGROUND

Technical Field

The invention relates to the field of peripheral devices of a computer, and in particular to a wireless charging mouse pad and manufacture process thereof.

Prior Art

A wireless optical mouse of peripheral products of a computer does not have a connecting line for connecting the computer and thus is not restricted by the connecting line, so that it is popular among consumers because of its ease of use, but the wireless optical mouse has the drawback of consuming more power than a traditional mechanical mouse.

Generally, a battery is used as a power supply of the wireless optical mouse to provide a wireless signal transmission circuit. The drawback of using the battery is that after used for a period of time, the power insufficiency may occur because the power of the battery is exhausted, so that the battery needs to be replaced sometimes, which is inconvenient during working, and the purchasing of the battery also increases the cost.

With regard to the above problems, a mouse pad with a wireless charging function is developed, which utilizes a coil embedded in the mouse pad to charge the battery of the wireless optical mouse in a wireless manner, so as to solve the problem of power insufficiency due to the consumption of the battery of the wireless optical mouse. However, currently, the mouse pad with a wireless charging function is a hard mouse pad, that is, the mouse pad is not flexible and cannot be furled, and therefore, the hard mouse pad occupies a certain space and is inconvenient to carry.

SUMMARY

Given the above problems, the purpose of the invention is to provide a wireless charging mouse pad and manufacture process thereof, the wireless charging mouse pad is flexible and may be furled to reduce its volume, so that the space occupied may be decreased and the wireless charging mouse pad may be convenient to carry.

A first embodiment of the invention is to provide a wireless charging mouse pad, comprising:
 a fiber layer;
 a first colloid adhered to a surface of the fiber layer;
 a second colloid provided on another surface of the fiber layer; and
 a first soft layer provided on the second colloid.

A second embodiment of the invention is to provide a wireless charging mouse pad, comprising:
 a soft layer;
 a first colloid adhered to a surface of the soft layer; and
 a second colloid adhered to the first colloid.

A third embodiment of the invention is to provide a manufacture process of a wireless charging mouse pad, comprising:
 adhering a first colloid to a surface of a fiber layer;
 providing a second colloid on another surface of the fiber layer; and
 providing a soft layer on the second colloid.

A fourth embodiment of the invention is to provide a manufacture process of a wireless charging mouse pad, comprising:
 adhering a first colloid to a surface of a soft layer; and
 adhering a second colloid to the first colloid.

DETAILED DESCRIPTION

In order to enable a person of ordinary skill in the technical field to which the invention pertains to understand the invention further, preferred embodiments of the invention are listed below, and in conjunction with the drawings, contents and expected effects of the invention are described in detail.

Figure 1:
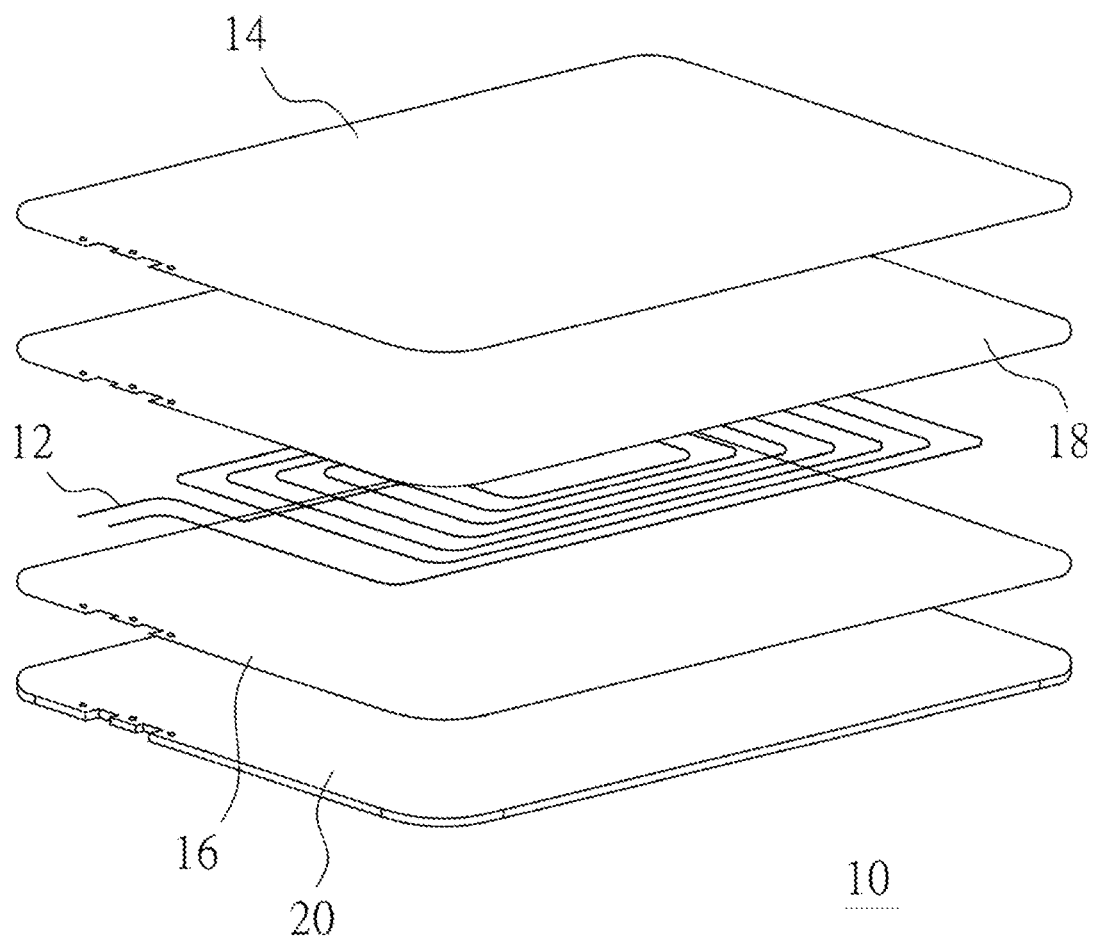
FIG. 1 is an exploded schematic diagram of a wireless charging mouse pad of a first embodiment of the invention.
Figure 2:
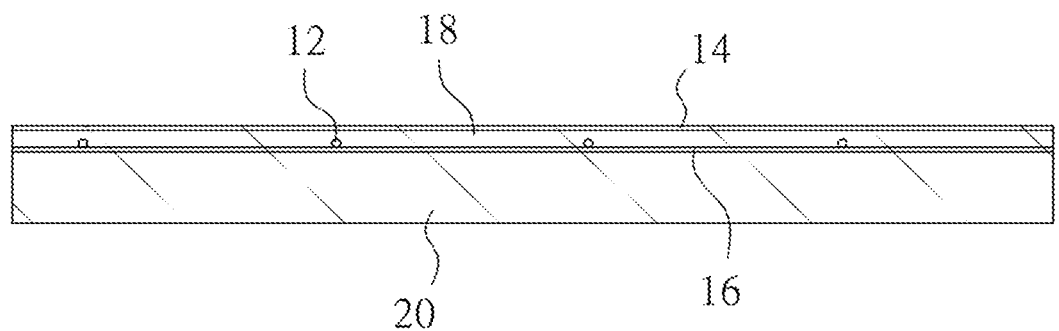
FIG. 2 is a partial schematic sectional diagram of the wireless charging mouse pad of the first embodiment of the invention.

FIG. 1 is an exploded schematic diagram of a wireless charging mouse pad of a first embodiment of the invention, and FIG. 2 is a partial schematic sectional diagram of the wireless charging mouse pad of the first embodiment of the invention. In the first embodiment, a wireless charging mouse pad 10 includes a winding coil 12, a first soft layer 14, a fiber layer 16, a first colloid 20, and a second colloid 18. The winding coil 12 is embedded in the wireless charging mouse pad 10, and when a wireless optical mouse (not shown) is placed on the wireless charging mouse pad 10, the winding coil 12 is powered on (for example, powered by a computer) to charge a battery (not shown) of the wireless optical mouse in a wireless manner. The fiber layer 16 is a fabric or a combination of fabric and polyurethane (PU), the first soft layer 14 is a fabric, non-woven fabric or a plastic thin film, the first colloid 20 is silica gel, rubber or polyurethane, and the second colloid 18 is hot melt glue, silica gel, rubber or polyurethane.

The first colloid 20 is adhered to a surface of the fiber layer 16 by known techniques (adhesive techniques such as glue, double faced glue). The winding coil 12 is provided on another surface of the fiber layer 16 (a surface opposite to the surface, to which the first colloid 20 is adhered, of the fiber layer 16), the second colloid 18 is provided on the winding coil 12 and another surface of the fiber layer 16, and the first soft layer 14 is provided on the second colloid 18.

Since the winding coil 12 is provided between the fiber layer 16 and the second colloid 18, when the fiber layer 16, the first soft layer 14, and the second colloid 18 are laminated, the winding coil 12 is encapsulated in the second colloid 18, so that the winding coil 12 is fixed in the second colloid 18 and cannot move.

The winding coil 12, the first soft layer 14, the fiber layer 16, the first colloid 20, and the second colloid 18 of the wireless charging mouse pad 10 are made of flexible materials such as fabric, polyurethane, non-woven fabric, silica gel, hot melt glue, and rubber respectively, so that the wireless charging mouse pad 10 may be furled to reduce its volume, and therefore, the space occupied may be decreased and the wireless charging mouse pad may be convenient to carry.

In another embodiment, a third colloid (not shown), for example, silica gel, may be adhered to another surface of the first soft layer 14 (a surface opposite to the surface, to which the second colloid 18 is adhered, of the first soft layer 14), and since the thickness of the wireless charging mouse pad 10 increases as the third colloid is adhered to the first soft layer 14, when the wireless optical mouse slides on the wireless charging mouse pad 10, the sliding surface of the wireless charging mouse pad 10 would not become unsmooth due to the embedding of the winding coil 12.

Figure 3:
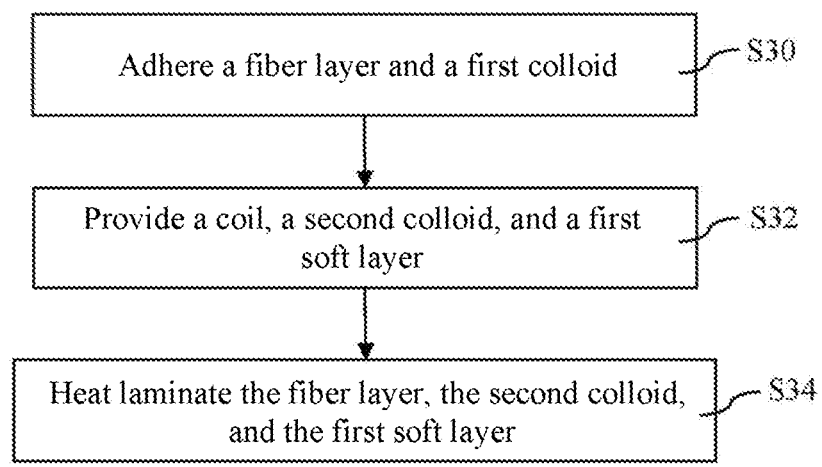
FIG. 3 is a flow chart of a manufacture process of the wireless charging mouse pad of the first embodiment of the invention.

FIG. 3 is a flow chart of a manufacture process of the wireless charging mouse pad of the first embodiment of the invention. Reference is made to the structures shown in FIG. 1 and FIG. 2 when describing the process steps shown in FIG. 3.

In FIG. 3, the first colloid 20 is adhered to a surface of the fiber layer 16 by known techniques (step S30). The winding coil 12 is provided on another surface of the fiber layer 16 (a surface opposite to the surface, to which the first colloid 20 is adhered, of the fiber layer 16), the second colloid 18 is provided on the winding coil 12 and another surface of the fiber layer 16, and the first soft layer 14 is provided on the second colloid 18 (step S32).

The fiber layer 16, the first soft layer 14, and the second colloid 18 are laminated (for example, hot laminated), so that the winding coil 12 is encapsulated in the second colloid 18, the second colloid 18 (for example, though hot melting) has adhesive property, and the second colloid 18 is adhered between a surface of the first soft layer 14 and a surface of the fiber layer 16 (step S34).

In another embodiment, a step of adhering a third colloid (not shown), for example, silica gel, to another surface of the first soft layer 14 (a surface opposite to the surface, to which the second colloid 18 is adhered, of the first soft layer 14) may be added, so as to increase the thickness of the first soft layer 14 plus the third colloid, and when the wireless optical mouse slides on the wireless charging mouse pad 10, the sliding surface of the wireless charging mouse pad 10 would not become unsmooth due to the embedding of the winding coil 12.

The wireless charging mouse pad 10 manufactured by the above manufacture process through the winding coil 12, the first soft layer 14, the fiber layer 16, the second colloid 18, and the first colloid 20 is flexible and may be furled to reduce its volume, so that the space occupied may be decreased and the wireless charging mouse pad may be convenient to carry.

Figure 4:
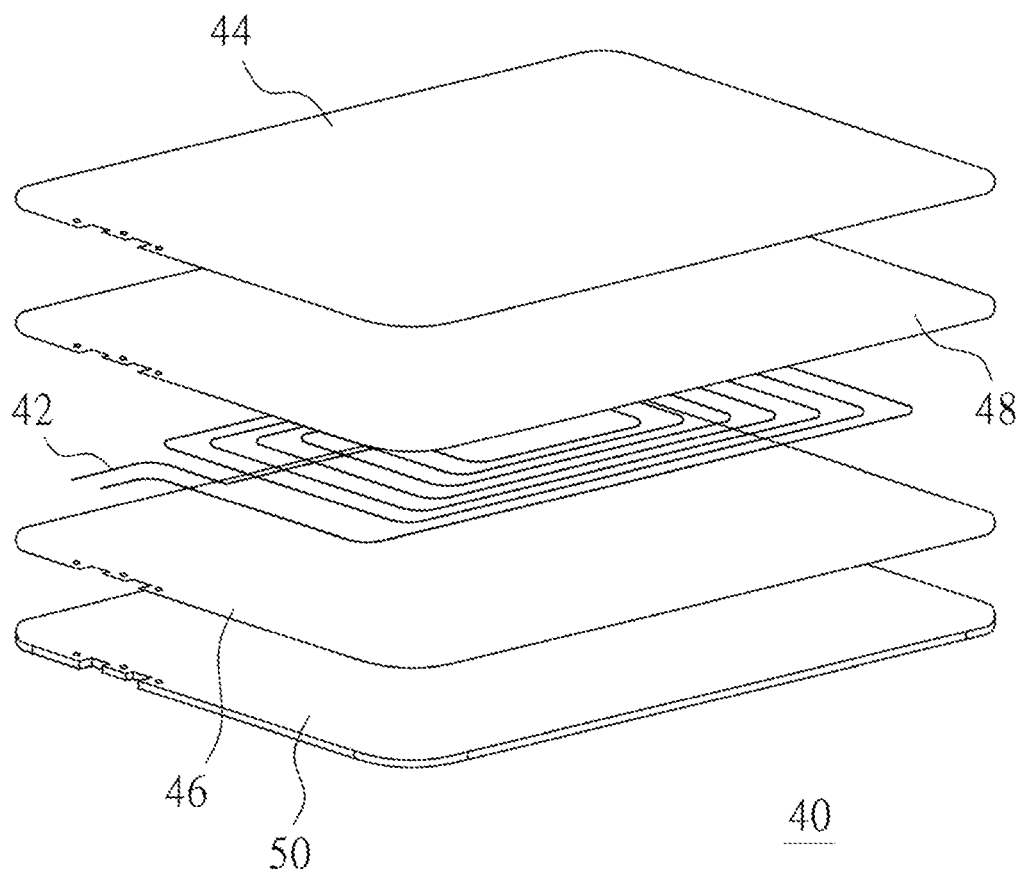
FIG. 4 is an exploded schematic diagram of a wireless charging mouse pad of a second embodiment of the invention.
Figure 5:
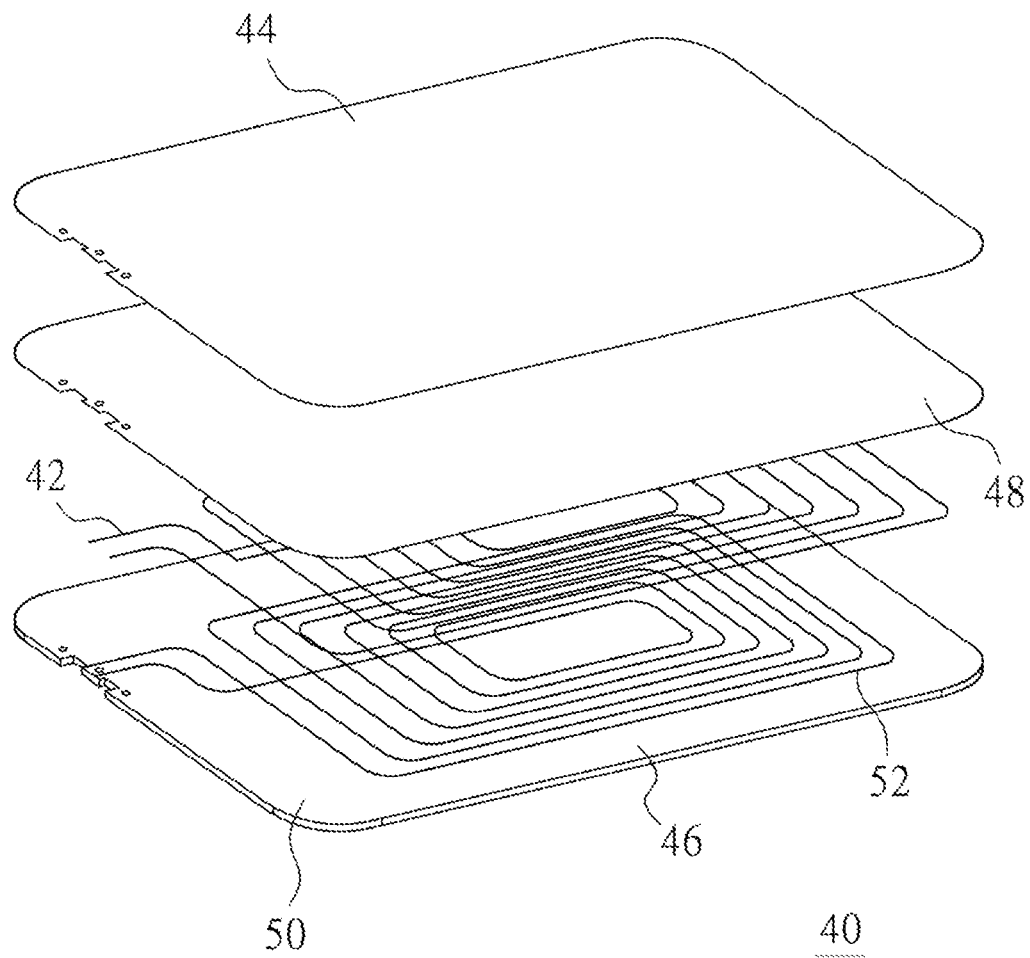
FIG. 5 is an exploded schematic diagram of the wireless charging mouse pad of the second embodiment of the invention after a groove is formed.
Figure 6:
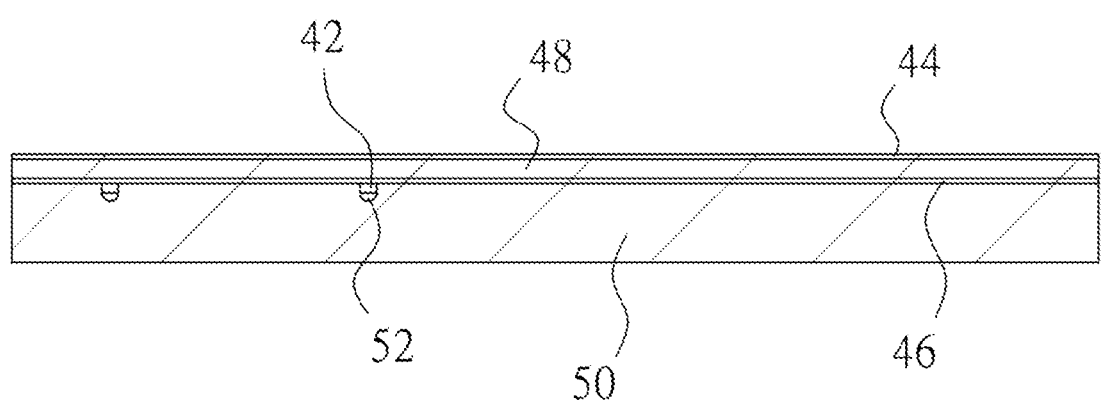
FIG. 6 is a partial schematic sectional diagram of the wireless charging mouse pad of the second embodiment of the invention.

FIG. 4 is an exploded schematic diagram of a wireless charging mouse pad of a second embodiment of the invention, FIG. 5 is an exploded schematic diagram of the wireless charging mouse pad of the second embodiment of the invention after a groove is formed, and FIG. 6 is a partial schematic sectional diagram of the wireless charging mouse pad of the second embodiment of the invention. In the second embodiment, a wireless charging mouse pad 40 includes a winding coil 42, a first soft layer 44, a fiber layer 46, a second colloid 48, and a first colloid 50. The fiber layer 46 is a fabric or a combination of fabric and polyurethane, the first soft layer 44 is a fabric, non-woven fabric or a plastic thin film, and the first colloid 50 and the second colloid 48 are silica gel, rubber or polyurethane.

The first colloid 50 is adhered to a surface of the fiber layer 46 by known techniques. A winding groove 52 for placing the winding coil 42 is formed on the fiber layer 46 and the surface by which the first colloid 50 is adhered to the fiber layer 46. The winding groove 52 is formed by dicing, in-mold forming, hot melting or laser engraving.

After the winding coil 42 is provided in the winding groove 52, the second colloid 48 provided on the winding coil 42 and another surface of the fiber layer 46 (a surface opposite to the surface, to which the first colloid 50 is adhered, of the fiber layer 46) is adhered to another surface of the fiber layer 46 by known techniques, and the first soft layer 44 is adhered to the second colloid 48 by known techniques. Since the second colloid 48 and the fiber layer 46 are adhered to each other, the winding coil 42 in the winding groove 52 is fixed and cannot move.

The winding coil 42, the first soft layer 44, the fiber layer 46, the first colloid 50, and the second colloid 48 of the wireless charging mouse pad 40 are made of flexible materials such as fabric, polyurethane, non-woven fabric, silica gel, and rubber respectively, so that the wireless charging mouse pad 40 may be furled to reduce its volume, and therefore, the space occupied may be decreased and the wireless charging mouse pad may be convenient to carry.

Figure 7:
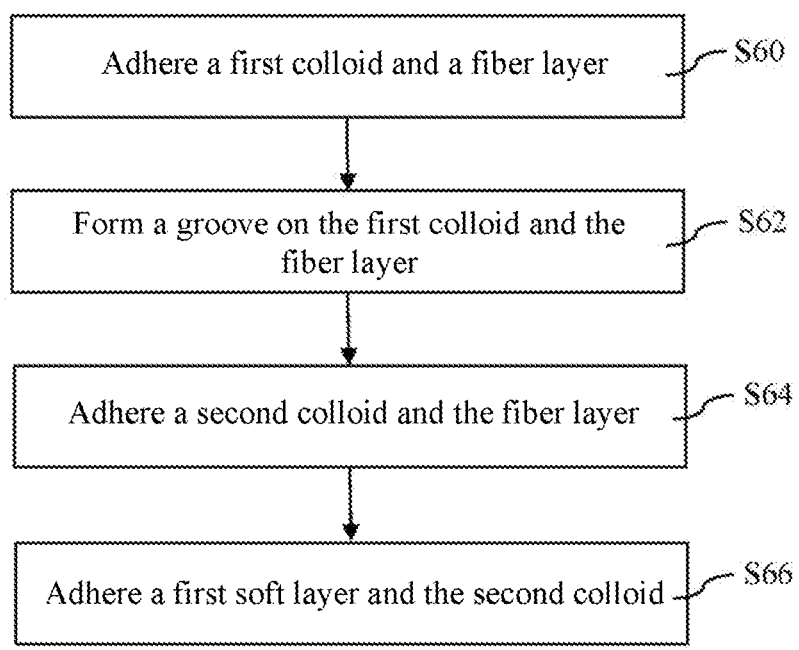
FIG. 7 is a flow chart of a manufacture process of the wireless charging mouse pad of the second embodiment of the invention.

FIG. 7 is a flow chart of a manufacture process of the wireless charging mouse pad of the second embodiment of the invention. Reference is made to the structures shown in FIG. 4 to FIG. 6 when describing the process steps shown in FIG. 7.

The first colloid 50 is adhered to a surface of the fiber layer 46 by known techniques (step S60). A winding groove 52 is formed on the fiber layer 46 and the surface by which the first colloid 50 is adhered to the fiber layer 46, and the winding coil 42 is provided in the winding groove 52 (step S62). The winding groove 52 is formed by dicing, in-mold forming, hot melting or laser engraving.

After the winding coil 42 is provided in the winding groove 52, the second colloid 48 provided on the winding coil 42 and another surface of the fiber layer 46 (a surface opposite to the surface, to which the first colloid 50 is adhered, of the fiber layer 46) is adhered to another surface of the fiber layer 46 by known techniques (step S64), and the first soft layer 44 is adhered to the second colloid 48 by known techniques. Since the second colloid 48 and the fiber layer 46 are adhered to each other, the winding coil 42 in the winding groove 52 is fixed and cannot move. The first colloid 44 is adhered to the first colloid 48 by known techniques (step S66).

The wireless charging mouse pad 40 manufactured by the above manufacture process through the winding coil 42, the first soft layer 44, the fiber layer 46, the first colloid 50, and the second colloid 48 is flexible and may be furled to reduce its volume, so that the space occupied may be decreased and the wireless charging mouse pad may be convenient to carry.

Figure 8:
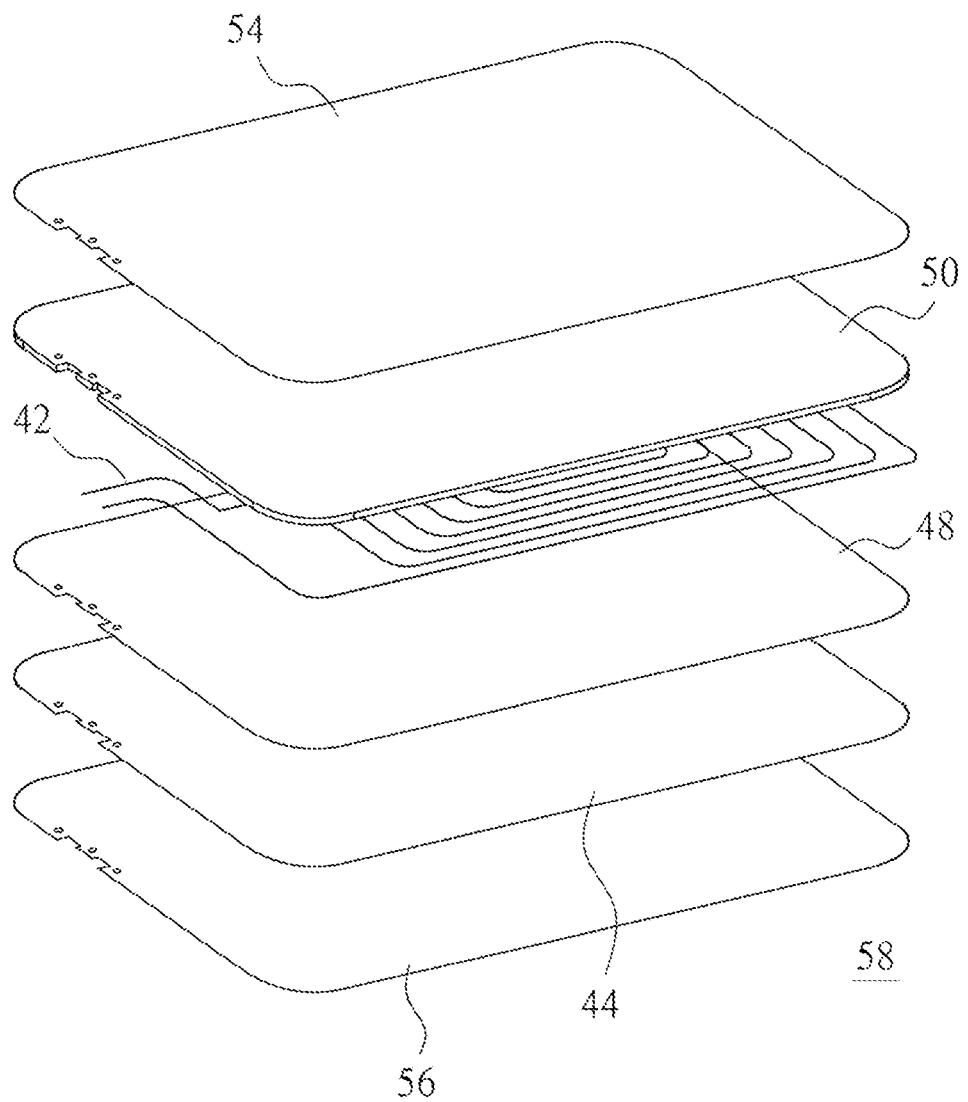
FIG. 8 is an exploded schematic diagram of a wireless charging mouse pad of a third embodiment of the invention.
Figure 9:
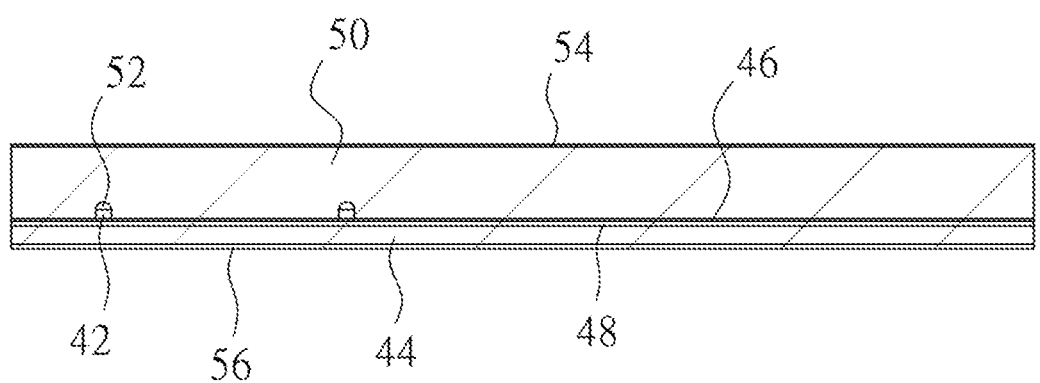
FIG. 9 is a partial schematic sectional diagram of the wireless charging mouse pad of the third embodiment of the invention.

FIG. 8 is an exploded schematic diagram of a wireless charging mouse pad of a third embodiment of the invention, and FIG. 9 is a partial schematic sectional diagram of the wireless charging mouse pad of the third embodiment of the invention. The wireless charging mouse pad 58 of the third embodiment differs from the wireless charging mouse pad 40 of the second embodiment in that the wireless charging mouse pad 58 of the third embodiment further includes a second soft layer 54 and a third colloid 56. The second soft layer 54 is a fabric, non-woven fabric or a plastic thin film, and the third colloid 56 is silica gel, rubber or polyurethane.

The second soft layer 54 and another surface opposite to the surface by which the first colloid 50 is adhered to the fiber layer 46 are adhered to each other by known techniques. The third colloid 56 is adhered to another surface of the first soft layer 44 (a surface opposite to the surface, to which the second colloid 48 is adhered, of the first soft layer 44).

Adhering the second soft layer 54 to another surface of the first colloid 50 may enable the wireless charging mouse pad 58 to be a double faced mouse pad, that is, the wireless optical mouse may slide on either surface of the wireless charging mouse pad 58 and be charged in a wireless manner.

Since the thickness of the wireless charging mouse pad 58 increases due to mutual adhesion of the first soft layer 44 and the third colloid 56, when the wireless optical mouse slides on the wireless charging mouse pad 58, the sliding surface of the wireless charging mouse pad 58 would not become unsmooth due to the embedding of the winding coil 42.

The winding coil 42, the first soft layer 44, the fiber layer 46, the second soft layer 54, the first colloid 50, the second colloid 48, and the third colloid 56 of the wireless charging mouse pad 58 are made of flexible materials such as fabric, polyurethane, non-woven fabric, rubber, and silica gel respectively, so that the wireless charging mouse pad 58 may be furled to reduce its volume, and therefore, the space occupied may be decreased and the wireless charging mouse pad may be convenient to carry.

Figure 10:
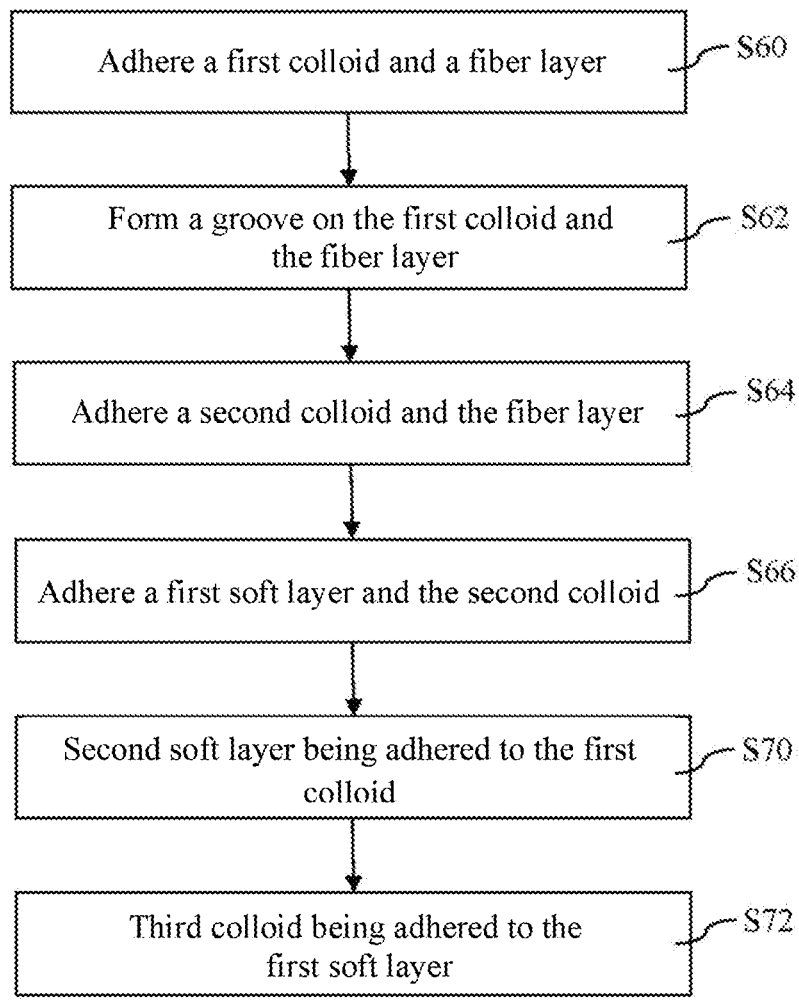
FIG. 10 is a flow chart of a manufacture process of the wireless charging mouse pad of the third embodiment of the invention.

FIG. 10 is a flow chart of a manufacture process of the wireless charging mouse pad of the third embodiment of the invention. Reference is made to the structures shown in FIG. 8 and FIG. 9 when describing the process steps shown in FIG. 10.

The manufacture process of the wireless charging mouse pad 58 in the third embodiment differs from the manufacture process of the wireless charging mouse pad 40 in the second embodiment in that the second soft layer 54 and another surface opposite to the surface by which the first colloid 50 is adhered to the fiber layer 46 are adhered to each other by known techniques (step S70). The third colloid 56 is adhered to another surface of the first soft layer 44 (a surface opposite to the surface, to which the second colloid 48 is adhered, of the first soft layer 44) (step S72).

The wireless charging mouse pad 58 manufactured by the above manufacture process through the winding coil 42, the first soft layer 44, the fiber layer 46, the second soft layer 54, the first colloid 50, the second colloid 48, and the third colloid 56 is flexible and may be furled to reduce its volume, so that the space occupied may be decreased and the wireless charging mouse pad may be convenient to carry.

Figure 11:
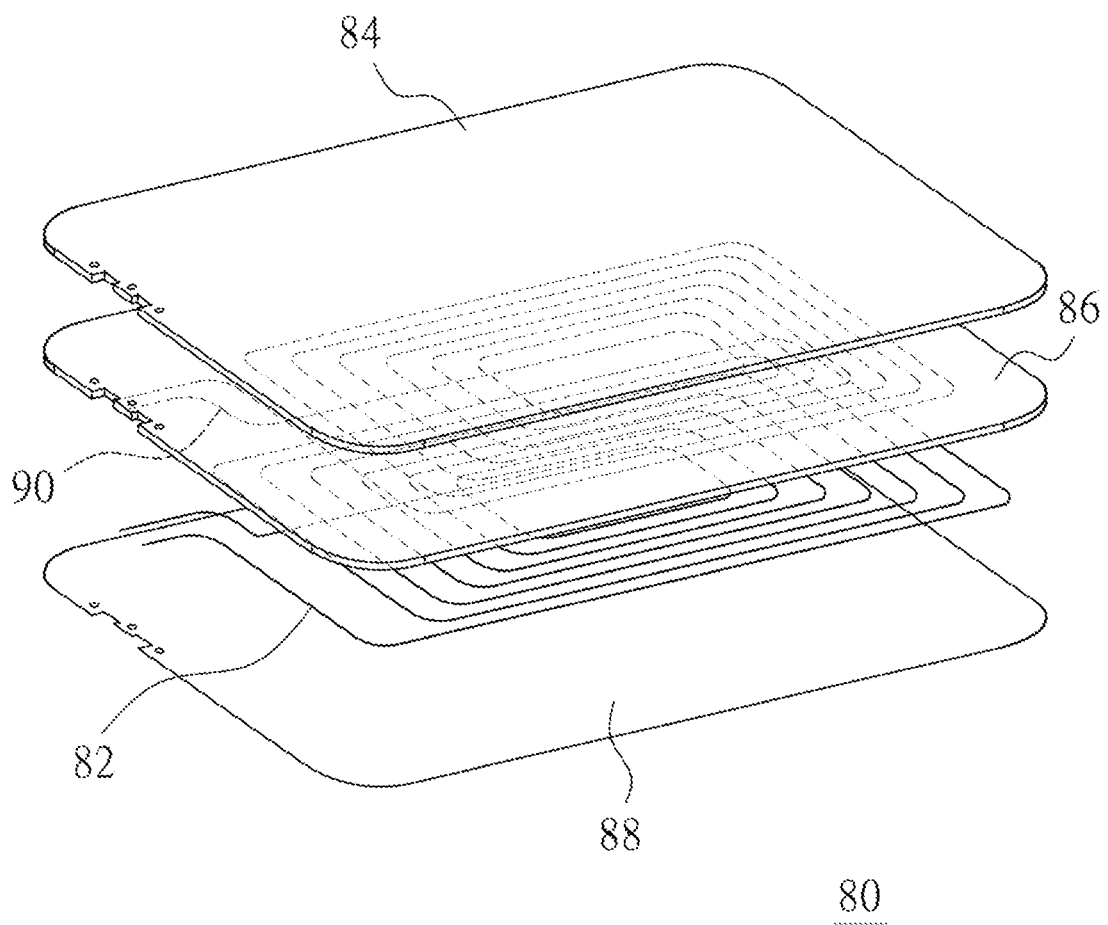
FIG. 11 is an exploded schematic diagram of a wireless charging mouse pad of a fourth embodiment of the invention.
Figure 12:
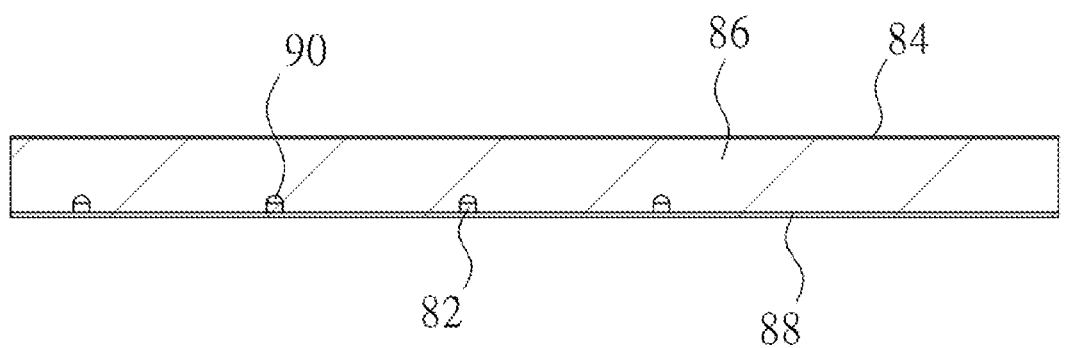
FIG. 12 is a partial schematic sectional diagram of the wireless charging mouse pad of the fourth embodiment of the invention.

FIG. 11 is an exploded schematic diagram of a wireless charging mouse pad of a fourth embodiment of the invention, and FIG. 12 is a partial schematic sectional diagram of the wireless charging mouse pad of the fourth embodiment of the invention. In the fourth embodiment, a wireless charging mouse pad 80 includes a winding coil 82, a soft layer 84, a first colloid 86, and a second colloid 88. The soft layer 84 is a fabric, non-woven fabric or a plastic thin film, and the first colloid 86 and the second colloid 88 are silica gel, rubber or polyurethane.

The first colloid 86 is adhered to a surface of the soft layer 84 by known techniques. A winding groove 90 for placing the winding coil 82 is formed on a surface of the first colloid 86, and the winding coil 82 is provided in the winding groove 90. The second colloid 88 is adhered to the first colloid 86 by known techniques. The winding groove 90 is formed by dicing, in-mold forming, hot melting or laser engraving.

The winding coil 82, the soft layer 84, the first colloid 86, and the second colloid 88 of the wireless charging mouse pad 80 are made of flexible materials such as fabric, polyurethane, non-woven fabric, silica gel, and rubber respectively, so that the wireless charging mouse pad 80 may be furled to reduce its volume, and therefore, the space occupied may be decreased and the wireless charging mouse pad may be convenient to carry.

Figure 13:
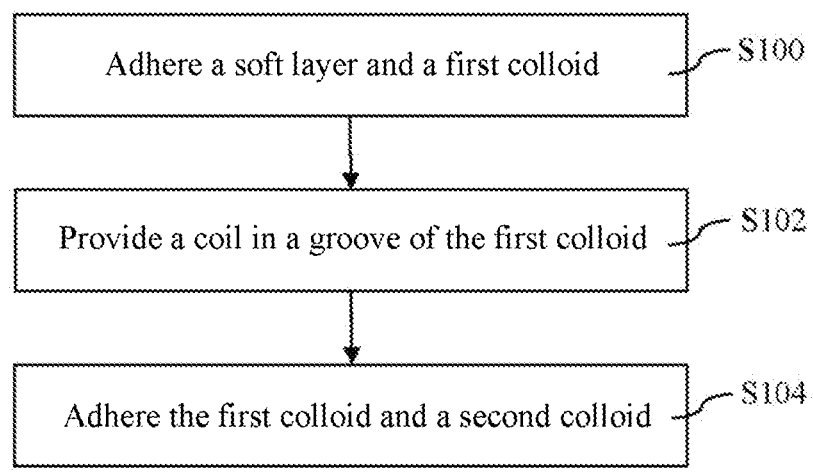
FIG. 13 is a flow chart of a manufacture process of the wireless charging mouse pad of the fourth embodiment of the invention.

FIG. 13 is a flow chart of a manufacture process of the wireless charging mouse pad of the fourth embodiment of the invention. Reference is made to the structures shown in FIG. 11 and FIG. 12 when describing the process steps shown in FIG. 13.

The first colloid 86 is adhered to a surface of the soft layer 84 by known techniques (step S100). A winding groove 90 is formed on a surface of the first colloid 86, and the winding coil 82 is provided in the winding groove 90 (step S102). The winding groove 90 is formed by dicing, in-mold forming, hot melting or laser engraving. The second colloid 88 is adhered to the first colloid 86 by known techniques (step S104).

The wireless charging mouse pad 80 manufactured by the above manufacture process through the winding coil 82, the soft layer 84, the first colloid 86, and the second colloid 88 is flexible and may be furled to reduce its volume, so that the space occupied may be decreased and the wireless charging mouse pad may be convenient to carry.

The invention is intended to provide a wireless charging mouse pad and manufacture process thereof, characterized in that the wireless charging mouse pad is flexible and may be furled to reduce its volume, so that the space occupied may be decreased and the wireless charging mouse pad may be convenient to carry.

Although the invention is described above with reference to preferred specific examples and exemplary figures, it should not be considered to be limiting. A person skilled in the art would make various modifications, omissions and changes to patterns of the invention and contents of the specific examples, without departing from the scope of the claims of the invention.

BRIEF DESCRIPTION OF THE REFERENCE NUMERALS

10 Wireless charging mouse pad
12 Winding coil

14 First soft layer
16 Fiber layer
18 Second colloid
20 First colloid
40 Wireless charging mouse pad
42 Winding coil
44 First soft layer
46 Fiber layer
48 Second colloid
50 First colloid
52 Winding groove
54 Second soft layer
56 Third colloid
58 Wireless charging mouse pad
80 Wireless charging mouse pad
82 Winding coil
84 Soft layer
86 First colloid
88 Second colloid
90 Winding groove

What is claimed is:

1. A wireless charging mouse pad, comprising:
a soft layer;
a first colloid including a first surface and a second surface opposite to the first surface, the first surface of the first colloid adhered to the soft layer;
a second colloid adhered to the second surface of the first colloid, wherein the soft layer, the second colloid, and the first colloid are stacked sequentially; and
a winding coil, a winding groove accommodating the winding coil being formed on the second surface of the first colloid, and the winding coil being provided in the winding groove, wherein
the soft layer is a fabric, non-woven fabric or a plastic thin film; and the first colloid and the second colloid are silica gel, rubber or polyurethane, and wherein the winding groove is formed by dicing, in-mold forming, hot melting or laser engraving.

2. A wireless charging mouse pad, comprising:
a fiber layer, including a first surface and a second surface opposite to the first surface;
a first colloid adhered to the first surface of the fiber layer;
a second colloid provided on the second surface of the fiber layer;
a first soft layer provided on the second colloid, wherein the first soft layer, the second colloid, the fiber layer and the first colloid are stacked sequentially; and
a winding coil provided between the fiber layer and the second colloid, the winding coil being encapsulated in the second colloid when the fiber layer, the first colloid, the first soft layer and the second colloid are hot laminated, wherein
the fiber layer is a fabric or a combination of the fabric and polyurethane; the first soft layer is the fabric, non-woven fabric or a plastic thin film; the first colloid is silica gel, rubber or the polyurethane; and the second colloid is hot melt glue, the silica gel, the rubber or the polyurethane.

* * * * *